(12) United States Patent
Lalancette et al.

(10) Patent No.: US 9,222,147 B2
(45) Date of Patent: Dec. 29, 2015

(54) METHOD FOR SELECTIVE PRECIPITATION OF IRON, ARSENIC AND ANTIMONY

(71) Applicant: Nichromet Extraction Inc., Montreal (CA)

(72) Inventors: Jean-Marc Lalancette, Sherbrooke (CA); Bertrand Dubreuil, Trois-Rivieres (CA); David Lemieux, Thetford Mines (CA)

(73) Assignee: Nichromet Extraction Inc. (CA)

( * ) Notice: Subject to any disclaimer, the term of this patent is extended or adjusted under 35 U.S.C. 154(b) by 149 days.

(21) Appl. No.: 13/822,829

(22) PCT Filed: Nov. 13, 2012

(86) PCT No.: PCT/CA2012/050800
§ 371 (c)(1),
(2) Date: Mar. 13, 2013

(87) PCT Pub. No.: WO2013/104045
PCT Pub. Date: Jul. 18, 2013

(65) Prior Publication Data
US 2014/0120012 A1 May 1, 2014

Related U.S. Application Data

(60) Provisional application No. 61/585,855, filed on Jan. 12, 2012.

(51) Int. Cl.
*C22B 15/00* (2006.01)
*C22B 3/44* (2006.01)
(Continued)

(52) U.S. Cl.
CPC ............ *C22B 15/0091* (2013.01); *C22B 3/20* (2013.01); *C22B 3/44* (2013.01); *C22B 19/26* (2013.01); *C22B 23/0469* (2013.01)

(58) Field of Classification Search
None
See application file for complete search history.

(56) References Cited

U.S. PATENT DOCUMENTS

| 2,493,596 A | 1/1950 | Reman |
| 2,822,243 A | 2/1958 | Brix |

(Continued)

FOREIGN PATENT DOCUMENTS

| EP | 467180 A2 | 1/1992 |
| RU | 2006128084 A | 2/2008 |

(Continued)

OTHER PUBLICATIONS

"International Application No. PCT/CA2012/050800, International Search Report and Written Opinion mailed Feb. 5, 2013", (Feb. 5, 2013), 14 pgs.

(Continued)

*Primary Examiner* — Melissa Swain
(74) *Attorney, Agent, or Firm* — Schwegman Lundberg & Woessner, P.A.

(57) ABSTRACT

A method for selectively processing a polymetallic oxide solution containing a plurality of base metals comprising at least one of: Cu, Co, Ni, Zn associated with iron, comprising acid leaching the solution; recovering a filtered leachate; oxidizing the leachate; and adjusting the pH of the leachate in presence of a complexing agent; wherein the acidic solution is one of: i) a hydrochloric acid solution and ii) a sulfuric acid solution at a pH lower than about 1.5, and the complexing agent is one of: i) ammonium chloride and ii) ammonium sulfate, the step of adjusting the pH comprising raising the pH to a range between about 2.5 and about 3.5.

14 Claims, 1 Drawing Sheet

(51) Int. Cl.
*C22B 3/20* (2006.01)
*C22B 3/00* (2006.01)

(56) References Cited

U.S. PATENT DOCUMENTS

| | | | |
|---|---|---|---|
| 3,886,257 A * | 5/1975 | Snell | 423/27 |
| 3,937,667 A | 2/1976 | Scott | |
| 4,123,499 A | 10/1978 | Welsh et al. | |
| 4,231,993 A | 11/1980 | Sandberg et al. | |
| 4,298,379 A | 11/1981 | Zambrano | |
| 4,572,822 A | 2/1986 | Abe et al. | |
| 4,615,731 A | 10/1986 | Thomas et al. | |
| 4,713,223 A | 12/1987 | Hooykaas | |
| 4,971,662 A | 11/1990 | Sawyer et al. | |
| 5,534,234 A | 7/1996 | Reddin et al. | |
| 6,455,018 B1 * | 9/2002 | Cuif | 423/21.1 |
| 6,656,247 B1 | 12/2003 | Genik-Sas-Berezowsky et al. | |
| 7,314,604 B1 | 1/2008 | Harvey et al. | |
| 7,892,505 B2 * | 2/2011 | McConnell | 423/27 |
| 2002/0094564 A1 | 7/2002 | Banfield et al. | |
| 2007/0098609 A1 | 5/2007 | McConnell | |
| 2010/0044243 A1 | 2/2010 | Cardarelli | |
| 2011/0163042 A1 | 7/2011 | Kobayashi et al. | |

FOREIGN PATENT DOCUMENTS

| | | |
|---|---|---|
| WO | WO-95/19320 A1 | 7/1995 |
| WO | WO-2008/052324 A1 | 5/2008 |

OTHER PUBLICATIONS

Nilsson, Leif, et al., "New process for zinc recovery from bacterial leach solutions", Scandinavian Journal of Metallurgy, 25, (1996), 161-171.

Shivrin, G. N, et al., "Sulfidizing Nonferrous Metals by Free Sulfur in Weakly Acid Solutions in the Presence of a Reducing Agent", Izv. V.U.Z. Tsvetn. Metall., 4, (1984), Abstract Only.

Teixeira, L. A, et al., "Precipitation of Jarosite From Manganese Sulphate Solutions", Iron Control in Hydrometallurgy, (Oct. 19, 1986), Abstract Only.

Tennakone, K., et al., "Extraction of pure metallic nickel from ores and plants at Ussangoda, Sri Lanka", J.Natn.Sci.Foundation Sri Lanka, 35(4), (2007), 245-250.

* cited by examiner

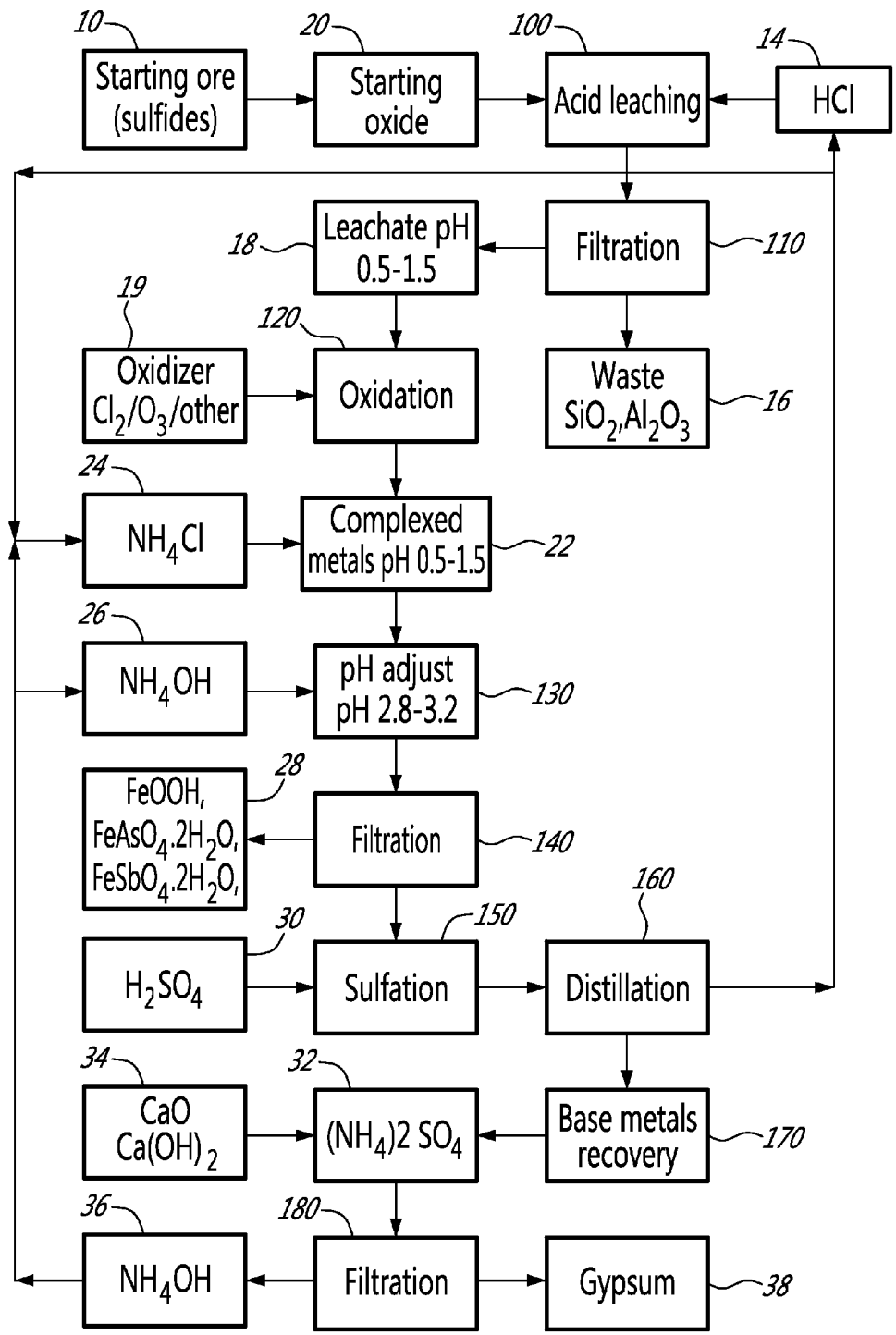

METHOD FOR SELECTIVE PRECIPITATION OF IRON, ARSENIC AND ANTIMONY

PRIORITY CLAIM TO RELATED APPLICATIONS

This application is a national stage application under 35 U.S.C. §371 of PCT/CA2012/050800, filed Nov. 13, 2012, not yet published, which claims priority to U.S. Provisional Application No. 61/585,855, filed Jan. 12, 2012, which applications are incorporated by reference as if reproduced herein and made a part hereof in their entirety, and the benefit of priority of each of which is claimed herein.

FIELD OF THE INVENTION

The present invention relates to hydrometallurgy. More specifically, the present invention is concerned with a method and a system for selectively treating polymetallic solutions containing a multiplicity of base metals associated with iron and arsenic for recovery of base metals.

BACKGROUND OF THE INVENTION

It is of frequent occurrence in the course of hydrometallurgy operations to have to separate mixtures of base metals such as magnesium, cobalt, nickel, zinc, and copper from manganese and iron, in the presence of variable amounts of arsenic and antimony. These complex solutions may result from acid digestion of polymetallic ores, either with hydrochloric acid or sulfuric acid, at atmospheric pressure or in autoclaves. Or they might originate from sulfide ores previously oxidized before acid leaching.

There is a number of methods to isolate metals or groups of metals from such polymetallic solutions. Selective precipitations, using bases such as sodium hydroxide NaOH or calcium hydroxide $Ca(OH)_2$, or even the corresponding carbonates ($Na_2CO_3$, $CaCO_3$), have been reported in many instances. More recently, ion exchange resins have been developed with rather specific capabilities towards a given cation or group of cations. As an alternate method, solvent extraction with a complexing agent is now of frequent use. In most cases, however, a pH adjustment is needed for these specific separation methods with solvent or resins, and the presence of iron often creates interferences.

In available methods for selectively extracting the base metals from the polymetallic solution, namely, solvent extraction, ion exchange resins, precipitation by pH adjustment, electrowinning for example, the pH is a key factor for a selective extraction. In many instances, it was found that, particularly with solutions rich in iron, this pH adjustment represented a very delicate step, since the precipitation of iron without losses of nickel, cobalt or copper called for a very fine control over said pH, at the level of 0.1 pH unit. Such a control, although possible at a small scale, becomes nearly impossible in a large reactor due to inhomogeneity and mixing problems. Also, the iron is often present at its two common valencies, ferrous and ferric, and these two species have vastly different solubilities at various pH. The net result is that ferric ion precipitate, while ferrous material is still soluble and readily reoxiding after filtration, leading to uncontrollable situations.

Therefore, it has been found desirable to develop a method for selectively treating polymetallic solutions containing a multiplicity of base metals associated with iron, for recovery of base metals of value without overlapping precipitation of iron-bearing fractions. This is particularly true if the acid leachate contains arsenic and antimony, the removal of these two metals from the solution being required for environmental reasons.

SUMMARY OF THE INVENTION

More specifically, in accordance with the present invention, there is provided a method for separation of at least one of: iron, arsenic and antimony from an acidic solution of base metals comprising at least one of: iron, arsenic, antimony, cobalt, nickel, copper and zinc, by pH adjustment in the presence of a complexing agent.

There is further provided a method for selectively processing a polymetallic oxide solution containing a plurality of base metals comprising at least one of: Cu, Co, Ni, Zn associated with iron, comprising acid leaching the solution; recovering a filtered leachate; oxidizing the leachate; and adjusting the pH of the leachate in presence of a complexing agent; wherein the acidic solution is one of: i) a hydrochloric acid solution and ii) a sulfuric acid solution at a pH lower than about 1.5, and the complexing agent is one of: i) ammonium chloride and ii) ammonium sulfate, the step of adjusting the pH comprising raising the pH to a range between about 2.5 and about 3.5.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 1 is a flowchart of a method according to an embodiment of an aspect of the present invention.

DESCRIPTION OF EMBODIMENTS OF THE INVENTION

The method will be described in relation to an embodiment illustrated in FIG. 1.

There exists a large variety of polymetallic ores (10, 20) that fall within the scope of the present invention, i.e. which present a problem for the separation of base metals when submitted to extractive hydrometallurgy. Such ores can be naturally occurring oxides, such as a nickel-bearing laterite for example, sulfides, such as an arsenopyrite, or arsenites.

In the case of a sulfurated starting ore (10), i.e. sulfides or arsenites, by controlled oxidation, the starting ore (10) may be oxidized to reduce the sulfur content to less than 0.5%, using known technologies, so as to transform it into a mixture of oxides (20). Typically, such a mixture of oxides (20) contains CuO, CoO, NiO, ZnO, FeO and $Fe_2O_3$ associated with silica or aluminosilicates of Na and other alkali. Arsenic and antimony may also be present as trivalent oxides. In several instances, the base metals are accompanied by precious metals, such as silver and gold, which are not involved at the stage of base metals recovery.

Either existing naturally as a mixture of oxides or resulting from an oxidation of a sulfide, this mixture of oxides (20) is submitted to acid leaching (step 100), to recover essentially all base metals. This leaching can be done in a leaching reactor operating at atmospheric pressure and reflux temperature with hydrochloric acid (14), giving a near-complete dissolution of base metals present such as Na, Mg, Ca, Fe, Co, Ni, Cu, Zn and Mn, with partial precipitation of lead. The leachate, which is acidic at a pH in the range between about 0.5 and about 1.5 at the end of leaching (step 100), is then filtered (step 110) to yield a leachate (18) free from the insoluble silica $SiO_2$ or aluminosilicates (16), which are discarded or further treated for precious metals collection, if present.

Then follows oxidation (step 120) of the filtered leachate (18) by an oxidizing agent (19) so as to oxidize iron, arsenic and antimony to maximum valency, i.e. to oxidize the dissolved iron to trivalent state ($Fe^{+3}$), and the arsenic and antimony to pentavalent state ($As^{+5}$) and ($Sb^{+5}$), while the metallic solution is still acidic, at a pH lower than 1.5, as follows:

$Fe^{+2} \rightarrow Fe^{+3}$
$As^{+3} \rightarrow As^{+5}$
$Sb^{+3} \rightarrow Sb^{+5}$

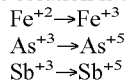

Then, a complexing agent (24) is added to the solution and the pH is raised to a value in the range between about 2.8 and about 3.2 (step 130) in order to achieve selective precipitation of iron and arsenate and/or antimonate. In step 130, the use of ammonia $NH_3$ as neutralizing agent for example allows a precipitation of more than 99.5% of iron and 99.9% of the arsenic and antimony, and retaining, by filtration (step 140) more than 99% of the cobalt, nickel, copper, and zinc in the solution. Other neutralizing agents may be ammonium hydroxide $NH_4OH$ or other bases such as calcium hydroxide $Ca(OH)_2$, sodium hydroxide NaOH and magnesium hydroxide $Mg(OH)_2$. If present, As and Sb are precipitated as insoluble ferric arsenate and antimony as insoluble ferric antimonate respectively (28).

The solution is then sulfated (step 150), by treatment with sulfuric acid $H_2SO_4$ (30) after the removal of Fe, As and Sb. The cations kept in solution are transformed into sulfates, and the hydrochloric acid removed as a 20% HCl azeotrope by distillation (step 160) and can be recycled for acid leaching (step 100) or as a complexing agent when combined with ammonia (24). This distillation can be done at atmospheric pressure, or under vacuum in a more economical fashion.

After the separation and recovery of base metals (Cu, Co, Ni, Zn) by known methods, such as for example ion exchange resins, electrowinning, or solvent extraction (step 170), the barren solution (32) is essentially a solution of ammonium sulfate $(NH_4)_2SO_4$. By addition of lime, i.e. calcium hydroxide or calcium oxide CaO (34), and filtration (step 180), ammonium hydroxide (36) is collected as a useful product, and can be recycled, for complexing and precipitation, while the sulfates are eliminated as gypsum $CaSO_4.2H_2O$ (38).

As people in the art will now be in a position to appreciate, the method allows selective precipitation of iron, arsenic and antimony, in the presence of dissolved base metals including cobalt ($Co^{2+}$), nickel ($Ni^{2+}$), copper ($Cu^{+2}$) and zinc ($Zn^{+2}$), based on acid digestion of a polymetallic oxides substrate obtained directly as an ore, such as laterites or resulting from the oxidation of polymetallic sulfides.

The present method comprises oxidizing all the iron to the ferric state $Fe^{+3}$ (step 120) prior to pH adjustment of the solution as described hereinabove (step 130). This oxidation (step 120) can be made with a variety of oxidizing agents (19), such as chlorine $Cl_2$, hypohalite, hydrogen peroxide $H_2O_2$, oxygen and other known oxidizers.

Attempts of iron removal at pH as low as 1.75 to as high as 2.7 after oxidation of iron to $Fe^{+3}$ led to coprecipitation of other base metals of interest, such as nickel, cobalt or copper, with the iron. This coprecipitation could reach values as high as 75% of the base metals concerned. Even with ammonium hydroxide $NH_4OH$, which is known as a very efficient reagent for the precipitation of iron, detrimental coprecipitation of other base metals was quite significant, in the range of 40 to 65%.

Surprisingly, it was noted that with the addition of a complexing agent (24) incorporating a nitrogen base, such as ammonium chloride $NH_4Cl$, ammonium sulfate $(NH_4)_2SO_4$ or another ammonium salt such as ammonium acetate, prior to the pH adjustment for the precipitation of iron (step 130), it became possible to precipitate iron quantitatively with ammonium hydroxide $NH_4OH$, while keeping all the base metals of the group Co, Ni, Zn and Cu in solution. Typically, a pH adjustment at 3.0 allows a near 100% separation of an hydrochloric leachate of Na, Mg, Fe, Co, Ni, Cu and Mn from a laterite into a complete precipitation of iron, while essentially all the magnesium, cobalt, copper and nickel remain in solution. In an experiment, the leachate was at pH 1.2 initially and was oxidized with chlorine $Cl_2$ prior to addition of ammonium chloride $NH_4Cl$, and then the pH was increased to 3.0 with ammonia $NH_3$. Without this addition of ammonium chloride $NH_4Cl$, an increase of pH in the leachate, from 1.2 to 2.7, resulted in the coprecipitation of iron, cobalt and nickel. Addition of an ammonium salt addition prior to raising the pH allowed clean separation of the Ni and Co cations from the Fe cations.

In the case of hydrochloric leachates containing arsenic and antimony, a frequent occurrence with sulfide ores of copper and zinc, the preliminary oxidation of the leachate to transform iron from ferrous to ferric (step 120) also oxidizes arsenic and antimony from trivalent to pentavalent state. Then, when pH is adjusted from 0.5 to 1.5 to values in the range of 2.8 to 3.2 (step 130), the precipitation of iron is accompanied by the formation of insoluble ferric arsenate (scorodite) and ferric antimonate (28), which removes essentially all the arsenic and antimony from the initial solution.

Without going into limitative theoretical considerations, it is thought that the addition of a complexing agent (24) such as an ammonium salt to the leachate prior to raising the pH of the solution (step 130) increases the solubility of the complexed species (22) of Cu, Co, Ni and Zn and allows a much broader zone of pH where only the iron precipitates, thus preventing coprecipitation of the iron with metals of value.

The amount of complexing agent (24) may vary, since complexes of metals of value (Cu, Co, Ni and Zn) call for from one ($NiCl_2.NH_4Cl.6H_2O$) to six nitrogen groups (Co $(NH_3)_6Cl_2$). Depending on the composition of the leachate with acid (18), the amount of added ammonium salt (24) is adjusted experimentally, at least one ammonium group being required for each atom of metals of value in the solution to six ammonium groups, as shown above.

The present method thus allows selective precipitation of iron, arsenic and antimony from an acidic solution containing a plurality of metals of value from the group of Cu, Zn, Co, Ni, Mg and Na by pH adjustment in the presence of a complexing agent. The acidic solution may be a hydrochloric acid solution or a sulfuric acid solution at a pH lower than about 1.5, and the complexing agent may be ammonium chloride, ammonium sulfate or an ammonium salt of an organic acid. The selective precipitation of Fe, As and Sb may be achieved at a pH in the range between about 2.5 and about 3.5, for example between about 2.8 and about 3.2, by raising the pH with a soluble base, such as ammonium hydroxide for example. Alternatively, the hydrochloric acid and chlorides in the initial solution may be substituted by sulfuric acid and sulfates after iron removal with the recycling of the hydrochloric acid. The residual ammonium sulfate after reclaiming the base metals of value may be treated with lime, i.e. calcium hydroxide or calcium oxide, in order to recycle the ammonia as ammonium hydroxide and ammonium chloride.

Although the present invention has been described hereinabove by way of embodiments thereof, it may be modified, without departing from the nature and teachings of the subject invention as recited herein.

The invention claimed is:

1. A method for separation of at least one contaminant from at least one base metal of an acidic polymetallic solution containing at least one base metal and at least one contaminant, the at least one base metal comprising at least one of: cobalt, nickel, copper and zinc, the at least one contaminant comprising at least one of: iron, arsenic and antimony, the method comprising:
   1) oxidation of the at least one contaminant to maximum valency using an oxidizing agent;
   2) addition of an ammonium salt as a complexing agent in a stoichiometric amount prior to
   3) neutralization of the solution, and then
   4) filtration to remove the at least one contaminant thus selectively precipitated from the solution and recovery of a barren solution and of the at least one base metal.

2. The method of claim 1, wherein the acidic polymetallic solution is one of: a hydrochloric acid solution and a sulfuric acid solution.

3. The method of claim 1, wherein the acidic polymetallic solution has a pH in a range between about 0.5 and about 1.5.

4. The method of claim 1, wherein the ammonium salt is one of:
   ammonium sulfate and ammonium chloride.

5. The method of claim 1, wherein said neutralization comprises increasing the pH to a value in a range between about 2.5 and about 3.5.

6. The method of claim 1, wherein said neutralization comprises increasing the pH to a value in a range between about 2.8 and about 3.2.

7. The method of claim 1, wherein said neutralization comprises using one of: ammonium hydroxide, ammonia, calcium hydroxide, sodium hydroxide and magnesium hydroxide.

8. The method of claim 1, further comprising treating the barren solution, after the recovery thereof, with lime and recovering a solution of ammonium salts.

9. A method for separating a base metal from a solution of oxides of the base metal associated with a contaminant, the base metal comprising at least one of: Cu, Co, Ni, and Zn, and the contaminant comprising at least one of: iron, arsenic and antimony, the method comprising:
   acid leaching the solution at atmospheric pressure and reflux temperature;
   recovering a filtered leachate;
   oxidizing the contaminate in the leachate to maximum valency using an oxidizing agent;
   adding an ammonium salt as a complexing agent in a stoichiometric amount depending on a composition of the leachate; and
   increasing the pH of the leachate after the ammonium salt is added; thereby selectively precipitating the contaminant from the leachate with the base metal maintained in solution therein;
   wherein said acid leaching the solution uses one of: i) a hydrochloric acid solution and ii) a sulfuric acid solution at a pH lower than about 1.5;
   said adding an ammonium salt comprises adding one of: i) ammonium chloride, ii) ammonium sulfate, and iii) ammonium acetate; and
   said increasing the pH comprises increasing the pH to a range between about 2.5 and about 3.5.

10. The method of claim 9, wherein said oxidizing the contaminant in the leachate comprises using chlorine $Cl_2$ as an oxidizing agent.

11. The method of claim 9, wherein said oxidizing the contaminant in the leachate comprises using one of: hypohalite, hydrogen peroxide $H_2O_2$ and oxygen.

12. The method of claim 9, wherein said increasing the pH comprising increasing the pH to a range between about 2.8 and about 3.2.

13. The method of claim 1, wherein said oxidation of the contaminant uses chlorine.

14. The method of claim 1, wherein said oxidation of the contaminant uses one of: hypohalite, hydrogen peroxide and oxygen.

* * * * *